US008374462B2

(12) United States Patent
Jiang et al.

(10) Patent No.: US 8,374,462 B2
(45) Date of Patent: Feb. 12, 2013

(54) CONTENT-AWARE IMAGE AND VIDEO RESIZING BY ANCHOR POINT SAMPLING AND MAPPING

(75) Inventors: Fan Jiang, Evanston, IL (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 945 days.

(21) Appl. No.: 12/465,158

(22) Filed: May 13, 2009

(65) Prior Publication Data

US 2010/0124371 A1    May 20, 2010

Related U.S. Application Data

(60) Provisional application No. 61/114,886, filed on Nov. 14, 2008.

(51) Int. Cl.
G06K 9/00 (2006.01)
G06K 9/46 (2006.01)
G06K 9/66 (2006.01)
G06K 9/32 (2006.01)

(52) U.S. Cl. ............... 382/298; 382/162; 382/190

(58) Field of Classification Search ............ 382/162, 382/190, 298
See application file for complete search history.

(56) References Cited

U.S. PATENT DOCUMENTS

| 6,999,105 | B2 | 2/2006 | Buerkle et al. |
| 7,206,029 | B2 | 4/2007 | Cohen-Solal |
| 2005/0226538 | A1 | 10/2005 | Di Federico et al. |
| 2006/0215922 | A1 | 9/2006 | Koch et al. |
| 2007/0025637 | A1 | 2/2007 | Setlur et al. |
| 2007/0081586 | A1 | 4/2007 | Raveendran et al. |
| 2008/0112647 | A1 | 5/2008 | Chu |
| 2008/0155420 | A1 | 6/2008 | Ubillos et al. |
| 2008/0205772 | A1 | 8/2008 | Blose et al. |
| 2008/0219587 | A1 | 9/2008 | Avidan et al. |
| 2008/0253690 | A1 | 10/2008 | Askelof et al. |
| 2011/0199536 | A1* | 8/2011 | Wolf et al. ............ 348/441 |

FOREIGN PATENT DOCUMENTS

EP    1 936 566 A1    6/2008

OTHER PUBLICATIONS

Avidan, S., et al., "Seam Carving for Content-Aware Image Resizing", In SIGGRAPH, 2007.
Bennett, E., et al., "Computational Time-Lapse Video", In SIGGRAPH, 2007.
Chen, B., et al., "Video Carving", In EUROGRAPHICS, 2008.
Deslaers, T., et al., "Pan, Zoom, Scan—Time-coherent, Trained Automatic Video Cropping", In Proc. IEEE Conf. on Computer Vision and Pattern Recognition, 2008.

(Continued)

Primary Examiner — Matthew Bella
Assistant Examiner — Jose M Torres

(57) ABSTRACT

Aspects of the present invention include systems and methods for resizing a set of images, which may comprises one or more images, while preserving the important content. In embodiments, the saliency of pixels in the set of images is determined using one or more image features. A small number of pixels, called anchor points, are selected from the set of images by saliency-based sampling. The corresponding positions of these anchor points in the set of target images are obtained using pixel mapping. In embodiments, to prevent mis-ordering of pixel mapping, an iterative approach is used to constrain the mapped pixels to be within the boundaries of the target image/video. In embodiments, based on the mapping of neighboring anchor points, other pixels in the target are inpainted by back-projection and interpolation. The combination of sampling and mapping greatly reduces the computational cost yet leads to a global solution to content-aware image/video resizing.

21 Claims, 17 Drawing Sheets

OTHER PUBLICATIONS

Fan, X., et al., "Looking into Video Frames on Small Displays", In ACM Multimedia, pp. 247-250, 2003.
Gal, R., et al., "Feature-aware texturing" In EUROGRAPHICS Symposium on Rendering, 2006.
Jojic, N., et al., "Scene Generative Models for adaptive video fast forward", In Proc. IEEE Int'l. Conf. on Image Processing, vol. 2, pp. 619-622, Sep. 2003.
Liu, D., et al., "Videocut: Removing irrelevant frames by discovering the object of interest", In Proc. European Conf. on Computer Vision, 2008.
Liu, F., et al., "Video Retargeting: Automating Pan and Scan", In ACM Multimedia, pp. 241-250, Oct. 23-27, 2006.
Pritch, Y., et al., "Non-Chronological Video Synopsis and Indexing", IEEE Trans. Pattern Anal. Mach, Intell., 2008.
Ren, T., et al., "Constrained Sampling for Image Retargeting", In Proc. IEEE Int'l Conf. on Multimedia and Expo, pp. 1397-1400, 2008.
Rubinstein, M., et al., "Improved Seam Carving for Video Retargeting" ACM SIGGRAPH Conference Proceedings, 2008.
Setlur, V., et al., "Retargeting Image and Video for Preserving Information Saliency", IEEE Computer Graphics and Applications, vol. 27, issue 5, pp. 80-88, Sep.-Oct. 2007.
Simakov, D., et al., "Summarizing Visual Data Using Bidirectional Similarity", In Proc. IEEE Conf. on Computer Vision and Pattern Recognition, 2008.
Tao, C., et al., "Active Window Oriented Dynamic Video Retargeting", In Proc. IEEE Int'l. Conf. on Computer Vision, 2007.
Wang, J., et al., "Video Content Representation on Tiny Devices", In Proc. IEEE Int'l. Conf. on Multimedia and Expo, vol. 3, pp. 1711-1714, 2004.
Wolf, L., et al., "Non-homogeneous Content-driven Video-retargeting", In Proc. IEEE Int'l. Conf. on Computer Vision, pp. 1-6, 2007.

* cited by examiner

A

B

A

B

A

B

C

D

CONTENT-AWARE IMAGE AND VIDEO RESIZING BY ANCHOR POINT SAMPLING AND MAPPING

BACKGROUND

A. Technical Field

The present invention pertains generally to image processing, and relates more particularly to image and video resizing.

B. Background of the Invention

The diversity of display devices and viewing conditions today imposes new demands on digital media. An image or video source needs to be shown in different display screens (computers, cell phones or PDAs), where different sizes or aspect ratios are required. A video source may also need to be shown with a different runtime for different purposes, such as, for example, for video summarization or for video editing.

Current techniques are not adequate to meet the demands created by the diversity of display devices and view conditions. For example, standard image scaling is insufficient to meet these demands because such techniques are oblivious to the image content and typically can only be applied uniformly. Cropping is also limited because it only removes pixels from the image periphery. Concerning runtime editing, "fast-forwarding" and "slow-down" schemes condense or elongate a video temporally by extracting or duplicating every nth frame; however, the important events in the original video may be altered by such a content-neutral approach.

SUMMARY OF THE INVENTION

Aspects of the present invention include systems and methods for resizing a set of images, which may be a single image or a video, while effectively preserving the important contents in the set of images. In embodiments, the saliency of pixels in the set of image is determined using one or more image features. A small number of pixels, called anchor points or anchor pixels, are selected from the set of images (image/video) by saliency-based sampling. The corresponding positions of these anchor points in a set of target images are obtained using efficient pixel mapping. In embodiments, to prevent disordering of pixel mapping, an iterative adaptation approach is used to constrain the mapped pixels to be within the boundaries of the set of target images (image/video). In embodiments, based on the mapping of neighboring anchor points, other pixels in the set of target images (image/video) are inpainted by back-projection and interpolation. The combination of sampling and mapping greatly reduces the computational cost yet leads to a globally sound solution to content-aware image/video resizing.

It should be noted that the present systems and methods have many advantages. First, the systems and methods are non-greedy solutions. The set of images (image/video) is resized directly to the desired size, instead of a sequential process used in some existing methods. Second, for video resizing, the systems and methods solve the mapping of pixels from all frames in one linear system, instead of solving that for every adjacent two frames. Thus, system and methods find a global solution for pixel mapping for the entire video. Third, the computational cost is greatly reduced by sampling a small number of anchor points and only calculating mappings for them rather than calculating initial mappings for all of the pixels. Fourth, to ensure a reasonable mapping result, the systems and methods provide for iterative adaptation approaches that maintain both spatial and temporal ordering of the pixels in the source set of images. It also ensures that pixels will not be mapped outside the boundaries in the set of target images. Fifth, the systems and methods extend the pixel mapping approach to temporal video resizing. Informative video contents, usually referring to important events, are preserved, while the unimportant contents are shortened or expanded based on the requests. Other advantages will be apparent to those skilled in the art.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
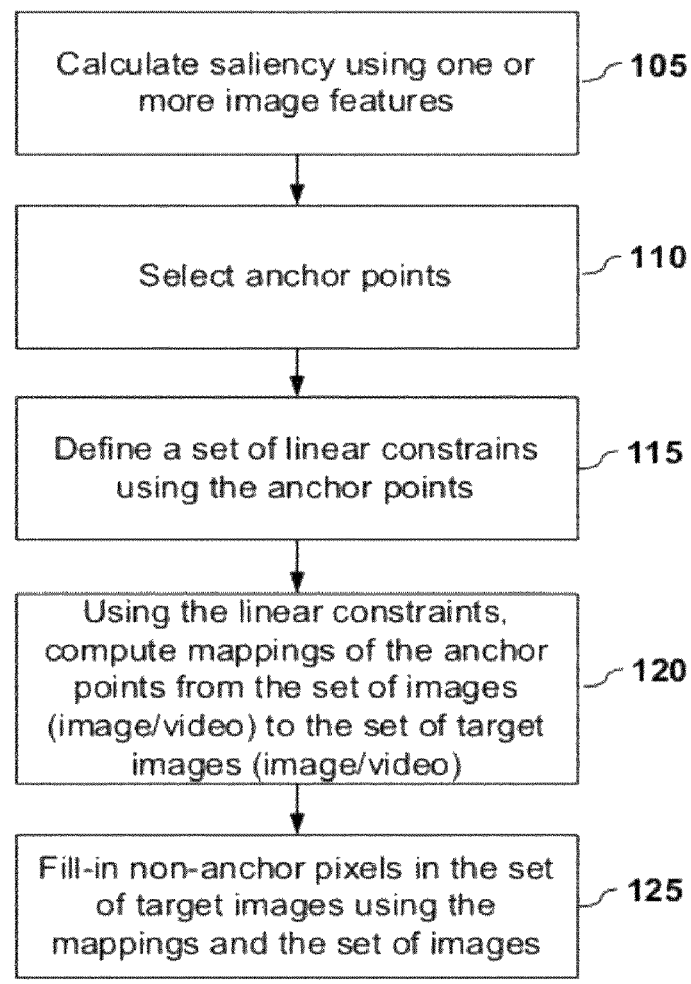
FIG. 1 depicts a method for resizing an image or video according to various embodiments of the invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including cameras, scanners, printers, computers, facsimile machine, mobile devices, including those devices with a display or camera capabilities, multimedia devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrated within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "an embodiment," or "embodiments," means that a particular feature, structure, characteristic, or function described in connection with the embodiment or embodiments is included in at least one embodiment of the invention and may be in more than one embodiment. The appearances of the phrase "in one embodiment," or "in an embodiment," or "in embodiments," in various places in the specification are not necessarily all referring to the same embodiment or embodiments.

The phrase "a set of images" shall be construed to mean a set of one or more images. Accordingly, a set of images may refer to a single image or may refer to a plurality of images, which may form a video. The term "triangulation" or "triangles" as used herein shall be construed to cover both triangulation and tetrahedralization and both triangles and tetrahedrons, respectively.

A. Overview

1. Prior Approaches

Image resizing, or retargeting, is the process of transforming an existing image to fit the dimensions of an arbitrary display. A compelling retargeting aims at preserving a viewer's experience by maintaining the information content of important regions in the image, while maintaining the aspect ratio of these important regions.

To effectively resize an image or video, the image/video content and as well as the geometric constraints should both be considered. Current image and video resizing methods include seam carving, video carving, and pixel mapping.

Seam-carving can change the size of an image by carving-out or inserting pixels in different parts of the image. Seam carving uses an energy function to define the importance of pixels. A seam is a connected path of low importance pixels crossing the image from top to bottom, or from left to right. By successively removing or inserting seams, the size of an image can be reduced or enlarged in both the x and y directions.

Another approach to resize the image is to map pixels in the original image to different positions in the resized image by solving a system of equations. When shrinking the image, those pixels with high importance are mapped to separate pixels in the resized image, while unimportant pixels are merged in the resized image.

Image seam-carving has also been extended to address video retargeting. In addition to fitting the desired display size while preserving the content, a retargeted video also needs to play smoothly in time. Therefore, a seam is defined as a monotonic and connected two-dimensional surface inside to a three-dimensional video cube (x, y, t). A video frame can be resized by continuously removing or duplicating two-dimensional surfaces with unimportant pixels from the video cube.

The pixel mapping approach has also been used in video frame resizing by incorporating some linear equations of pixels at adjacent frames to preserve time smoothness.

To resize video temporally, which typically means shortening a video, involves taking a long video stream with m frames and condense it into a short viewable clip with n frames (where n<m) that, ideally, preserves the most important information. While most approaches reduce the video size by eliminating whole frames from the video stream, each deleted frame does not have to consist of pixels from a single time step. Operating on a video cube (x, y, t), video carving can delete a two-dimensional surface in the time domain (instead of x or y domain) with unimportant pixels, shortening the video time length by one. This algorithm repeatedly carves out surfaces of smallest importance until the desired video length is reached.

2. Problems of Prior Approaches

Seam carving is a stepwise and discrete solution. For image or video frame shrinking, the width (or the height) of the image is reduced by one pixel at a time. The first seam carving is optimal because one path of pixels with lowest importance is deleted. However, the n (n>1) seam carving does not guarantee the removal of n seams with least pixel importance. This is due to its stepwise nature, i.e., each carving only considers the optimal at the current step. For image or video frame enlarging, to enlarge the width (or the height) by k, the first k seams for removal are found. Then the pixels of these seams are duplicated in order. However, if k is equal to the width, duplicating all the seams in an image is equivalent to standard scaling. Practically, the enlarging process is broken into several steps. Each step does not enlarge the size of the image in more than a fraction of its size from the previous step. Nevertheless, extreme enlarging of an image would most probably produce noticeable artifacts.

For video carving, the memory requirements of storing the entire data structure can be significant. In order to process videos of larger sizes, the input video is broken up into smaller video subsets, each which can fit entirely within memory. Then time carving is continuously performed for each subset until video reaches the desired size. Since each video subset that was processed was too short, the algorithm is often forced to remove frames across a moving object even though there are other better choices in other subsets.

The approach of pixel mapping is to solve an unconstrained linear system. Since no other constraints are enforced in the pixel mapping process, the ordering of pixels can be altered in the target image, i.e., left pixel mapped to the right, and right pixel mapped to the left. One of the consequences is that some pixels may be mapped outside the image borders. Another issue is the extremely high computational cost, since it requires solving a huge linear system of equations. Although the mappings recovered using an unconstrained system of equations may not contain noticeable artifacts due to changes in the order of the pixels, in practice, there are many occasions when pixels are mapped out of bounds. This presents a non-trivial problem.

Furthermore, the computation cost of pixel mapping is high because the mapping of every pixel in the original image needs to be calculated by solving pseudo inverse of a huge matrix.

For video frame resizing, the mapping of pixels at a current frame is calculated based on the previous frame's mapping, which enables online processing. However, with only two adjacent frames considered, the calculated mapping is not globally optimal for all frames. It is very possible that future video frames are more informative than current frames, which should affect the mapping of pixels at current frames. Ideally, mapping of pixels at all frames needs to be computed in one linear system. But this linear system becomes huge and solving it can be unaffordable. Also, pixel mapping under this framework cannot be used for video temporal resizing.

B. Method Embodiments

Disclosed herein are efficient yet effective approaches for content-aware image/video resizing. In embodiments, systems and methods allow for the processing of the image/video as a whole to obtain a global solution. To obtain a global solution, particularly when processing high resolution images or large videos, a highly efficient algorithm is necessary.

1. Overall Method Embodiments

FIG. 1 depicts a method for resizing an image or video (100) according to various embodiments of the invention. The method begins by determining (105) the saliency of pixels in the set of input images (whether a single image or video). As will be discussed in more detail below, the saliency value may be obtained by combining a number of image features. The saliency information can then be used to select (110) a small representative subset of pixels, called anchor points or anchor pixels, by saliency-based sampling. These anchor pixels are used to define (115) a set of linear constraints. By solving the set of linear constraints, a set of mappings are obtained (120), which yields the corresponding positions of these anchor point in the target image/video. Since the mapping of any pixel in the source image/video to the target image/video can be calculated based on the mapping of its neighboring anchor points, non-anchor target pixels can be filled in (125). In embodiments, the non-anchor target pixels can be filled in by being inpainted by back-projection and interpolation.

The combination of sampling and mapping greatly reduces the computational cost and enables achieving a global solution. It should be noted that for video resizing, the disclosed systems and methods achieve an optimal mapping of pixels in all frames as one unified optimization process, instead of processing two frames at a time as in previous methods.

Also disclosed herein is an iterative adaptation approach to mapping to prevent mis-ordering of pixels after mapping to the target image/video. By constraining the ordering, pixels are not mapped outside of the image/video borders.

2. Determining Saliency

Figure 2:
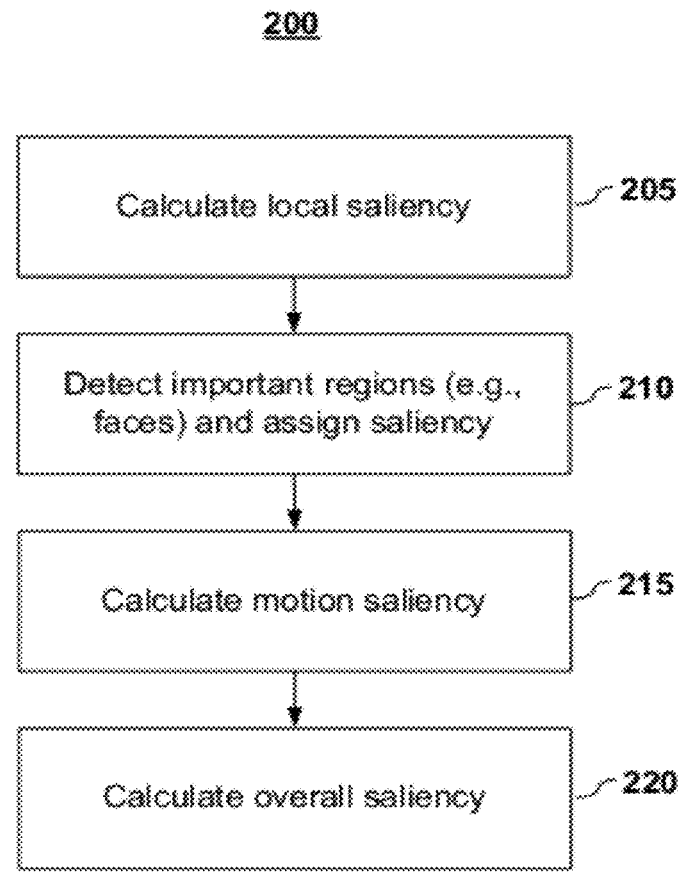
FIG. 2 depicts a method for determining saliency of pixels in an image or video according to various embodiments of the invention.

As noted above, a saliency (importance) value is assigned to pixels in the input image or video. The saliency value may be based on one or more image feature elements. FIG. 2 depicts a method for determining saliency of pixels in an image or video according to various embodiments of the invention. In the method (200) depicted in FIG. 2, the saliency, S, includes at least two of the following three parts: local saliency $S_e$, important region detection $S_f$ and motion detection $S_m$.

In embodiments, local saliency can be obtained (205) by detecting a spatial gradient magnitude in the input image or video. It shall be noted that a number of well known methods exist for calculating spatial gradient or edges in images and that no particular method is critical to the present invention. In embodiments, the spatial gradient magnitude is used as the local saliency, $S_e$:

$$S_e = \sqrt{\left(\frac{\partial I}{\partial x}\right)^2 + \left(\frac{\partial I}{\partial y}\right)^2}, \quad \text{Eq. 1}$$

normalized by the maximum gradient value across the image/video.

In order to avoid deforming important regions, important regions of the image may be detected and assigned (210) a high saliency value. Detecting important regions may be performed using any of a number of segmentation or detection methods. For example, in embodiments, frontal portraits may be detected using a face detection mechanism, such as, by way of illustration and not limitation, the face detection mechanism disclosed by P. Viola and M. Jones in "Robust real-time face detection," International Journal of Computer Vision (IJCV) 57(2) 137-154, 2004. In embodiments, one can manually select important regions to preserve after resizing.

All of the important regions (i=1, 2, 3, . . . ) detected in the set of input images may be set to be a high saliency, a, as conveyed in the following formula:

$$S^i_f = a, \; i=1,2,3, \quad \text{Eq. 2}$$

In embodiments, the saliency value a is set to be close to 1.

In embodiments, the overall saliency may also include (215) saliency based upon motion. Moving objects in a video tend to draw most of a viewer's attention and are therefore content-wise important. In embodiments, by using a block-based motion detection mechanism, the motion saliency, $S_m$, can be set to be proportional to the magnitude of motion vectors.

$$S_m \propto |mv| \quad \text{Eq. 3}$$

and normalized by the maximum magnitude across the image or video.

In embodiments, a Block Matching Algorithm (BMA), which used in many video compression standards (e.g., MPEG-1), can be applied. In embodiments, the BMA tries to find a matching block of the 16*16 macro-block in frame i from the next frame j. One way in which matching blocks are found is by full searching a neighborhood (size d) of the macro-block and finding the one that has the smallest Sum of Absolute Differences (SAD). The relative position of the matching block is used as the motion vector. In embodiments, the motion vector is normalized by the maximum possible value, which is the size of the searching neighborhood. Thus, in embodiments, Eq. 3 may be written as $$S_m = \frac{1}{d}|mv|.$$

It shall be noted one skilled in the art shall be aware of other motion detection means and that no particular motion detection means is critical to the present invention.

In embodiments in which motion saliency is not included in the overall saliency of a pixel, the overall saliency, S, is determined according to the following formula:

$$S = \min\left(S_e + \sum_i S_f^i, 1\right) \quad \text{Eq. 4}$$

In embodiments, the saliency value ranges between 0 and 1, where zero values are, content wise, non-important pixels.

In embodiments in which motion saliency is included in the overall saliency of a pixel, the calculated overall saliency, S, is determined (220) according to the following formula:

$$S = \min\left(S_e + \sum_i S_f^i + S_m, 1\right) \quad \text{Eq. 5}$$

Once again, the saliency value ranges between 0 and 1, where zero values are, content wise, non-important pixels.

One skilled in the art shall recognize that more or fewer saliency factors can be included in determining the saliency of pixels in the set of input images.

Figure 3:
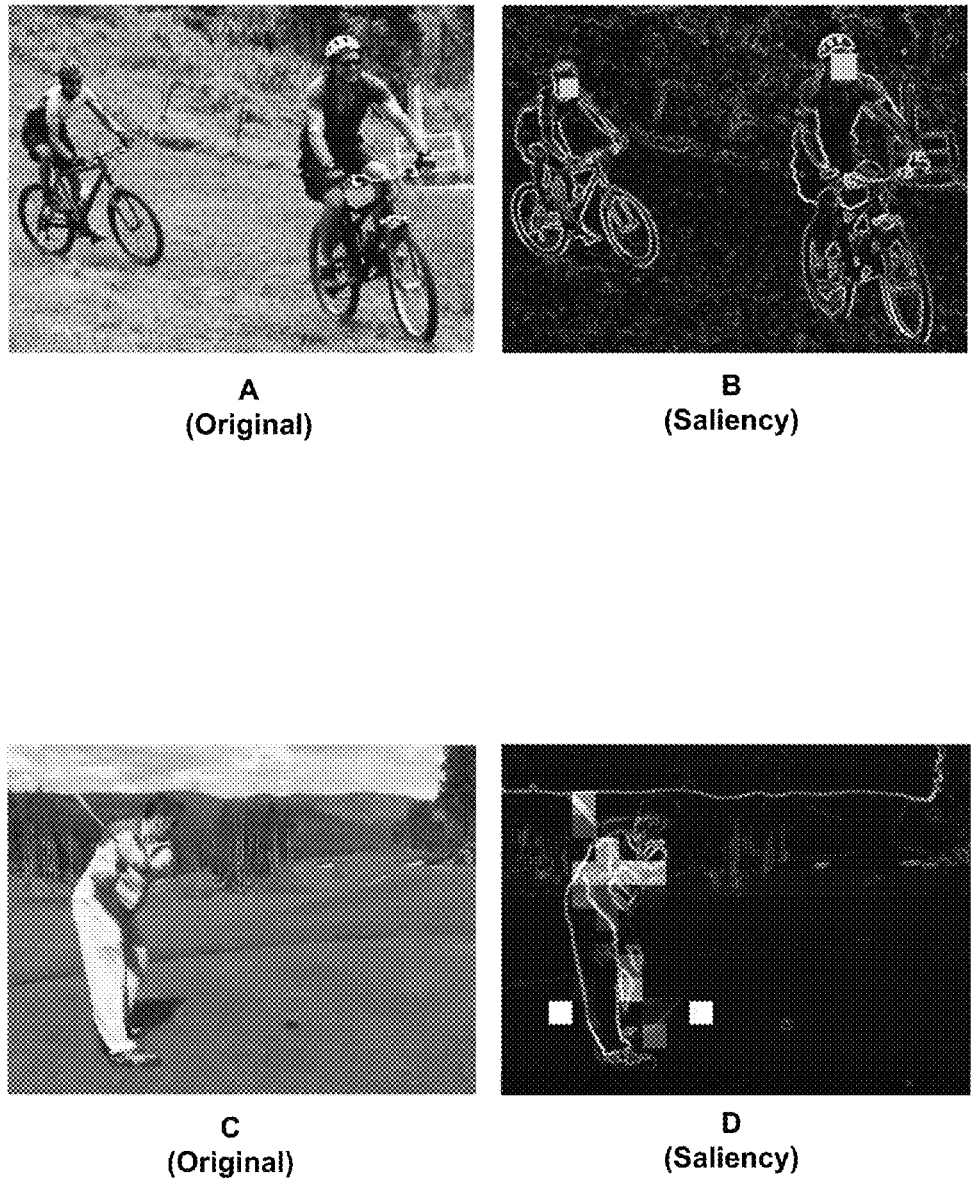
FIG. 3A depicts an image and an associated saliency map (FIG. 3B) according to various embodiments of the invention.
FIG. 3C depicts an image frame of a video and its associated saliency map (FIG. 3D) according to various embodiments of the invention.

FIG. 3 depicts two sets of examples according to embodiments of the present invention. FIG. 3A shows an original image and FIG. 3C shows one frame selected from an original input video. FIGS. 3B and 3D show their corresponding saliency maps. Note that image edges, frontal faces (two squares in FIG. 3B) and motion (blocks in FIG. 3D) are noticeable with high brightness, which refers to high saliency values.

3. Anchor Point Sampling

In prior methods, every pixel in the original image is mapped to a pixel in the resized image. Such methods require the solution of an enormously large linear system. For video frame resizing, even more equations, related to time smoothness of two adjacent frames, are incorporated into the linear system. This makes the computational load even heavier. It is thus infeasible to pursue a global solution for all frames in one video clip.

In practice the mappings of pixels from a source image/video to the target image/video are often dependent on each other. Thus, the mapped locations of many pixels can be inferred from the mappings of related pixels; therefore, it is unnecessary to explicitly compute the mappings of all pixels. Thus, the mappings of a small number of key pixels can be computed first, and the positions of the other pixels in the target can be inferred based on their dependence. To illustrate this point, a simple example is provided below.

Figure 4:
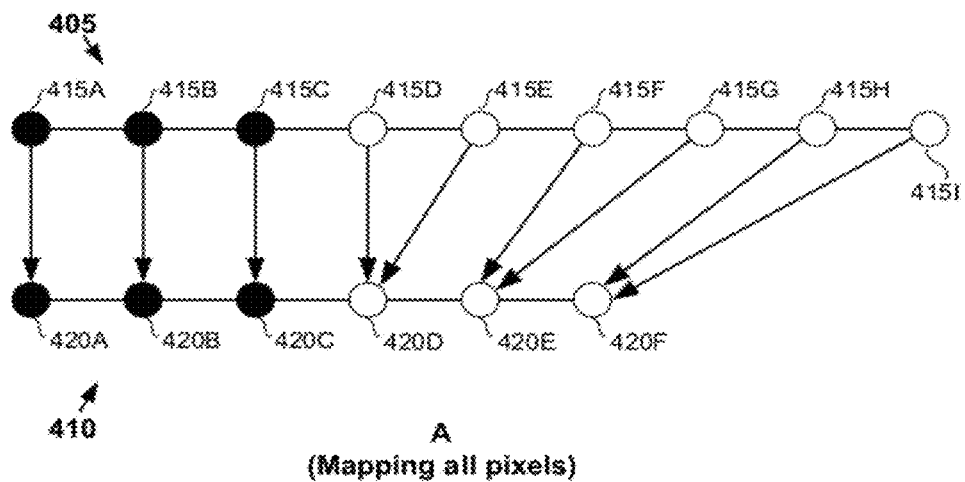
FIG. 4 depicts methods of mapping pixels according to various embodiments of the invention.
Figure 4:
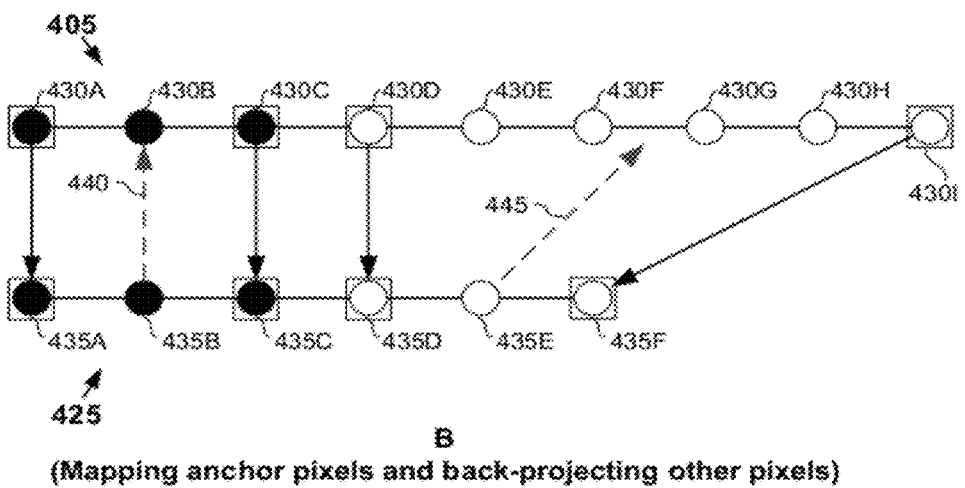

FIG. 4 depicts methods of mapping pixels according to various embodiments of the invention. In the example shown in FIG. 4A, the original image 405 has 9 pixels, which form a horizontal line. The left three (solid) pixels 415A-415C have high saliency and the right six (empty) pixels 415D-415I have low saliency. When the image is resized to a width of six pixels, a typical pixel mapping method maps the left three pixels 415A-415C to the same position 420A-420C in the resized image 410 as these pixels are content-wise important. The right six pixels 415D-415I are merged into three pixels 420D-420F in the resized image 410 as these pixels are content-wise unimportant. In the example depicted in FIG. 4A, the mappings of all the nine pixels 415A-415I are calculated. However, as every solid pixel has the similar mapping (one-to-one mapping) and every empty pixel 415D-415I has a similar mapping (two-to-one mapping), it is possible to just calculate the mapping of the "boundary" pixels (the four pixels in FIG. 4B with boxes around them, namely pixels 430A, 430C, 430D, and 430I), and warp the "inner" pixels (the five pixels without boxes in FIG. 4B, namely pixels 430B and 430E-430H) within the "boundaries" proportionally to the mapping of the closest "boundary" pixels. The warping is done by back-projection of target to source, shown as dashed arrows 440 and 445 in the resized image 425 shown in FIG. 4B, followed by linear interpolation. This gives the same resizing result as in FIG. 4A, but only requiring the calculation of four pixel mappings.

These "boundaries" pixels are referred to herein as "anchor points" or "anchor pixels," which in FIG. 4B are located at the edges of the saliency map, i.e., pixels with high gradient of saliency. As will be discussed in more detail below, in embodiments, anchor points are randomly selected but the probability for each pixel to be chosen is proportional to its associated saliency gradient value. In embodiments, pixels with non-zero saliency gradient value may be regarded as edges (strong edges or weak edges). For pixels not on the edges of the saliency map, their saliency gradients are close to 0, and thus they are rarely sampled. Therefore, statistically, pixels on the saliency map edges will be selected in general.

Figure 5:
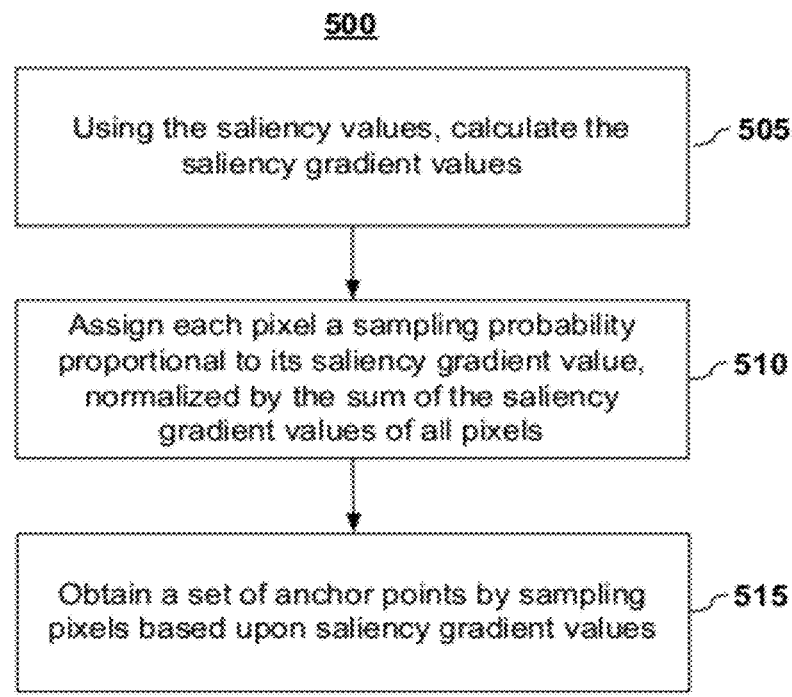
FIG. 5 depicts a method for selecting anchor pixels according to various embodiments of the invention.

Turning now to FIG. 5, a method 500 is depicted for selecting anchor pixels according to various embodiments of the invention. The method illustrated in FIG. 5 begins by using the saliency values of the pixels to calculate (505) saliency gradient values. In embodiments, a saliency gradient map comprising the saliency gradient values can be obtained according to the following formula:

$$\sqrt{\left(\frac{\partial S}{\partial x}\right)^2 + \left(\frac{\partial S}{\partial y}\right)^2}. \quad \text{Eq. 6}$$

Similarly for videos, the anchor points are preferably pixels in the 3D video cube (x, y, t) with high three-dimensional (3D) gradient of saliency. In embodiments, a 3D saliency gradient map can be obtained using the following formula:

$$\sqrt{\left(\frac{\partial S}{\partial x}\right)^2 + \left(\frac{\partial S}{\partial y}\right)^2 + \left(\frac{\partial S}{\partial t}\right)^2}. \quad \text{Eq. 7}$$

Given the saliency gradient information for the pixels, pixels in the input image/video can be assigned (510) a sampling value proportional to its saliency gradient value. In embodiments, the saliency gradient value is normalized by the sum of the saliency gradient values of the pixels. Thus, pixels with high gradient of saliency (two-dimensional or three-dimensional) have higher possibility of being selected than pixels with lower saliency values.

Figure 6:
FIG. 6 illustrates examples of anchor points in an image (FIG. 6A) and in a frame of a video (FIG. 6B) according to various embodiments of the invention.
Figure 6:
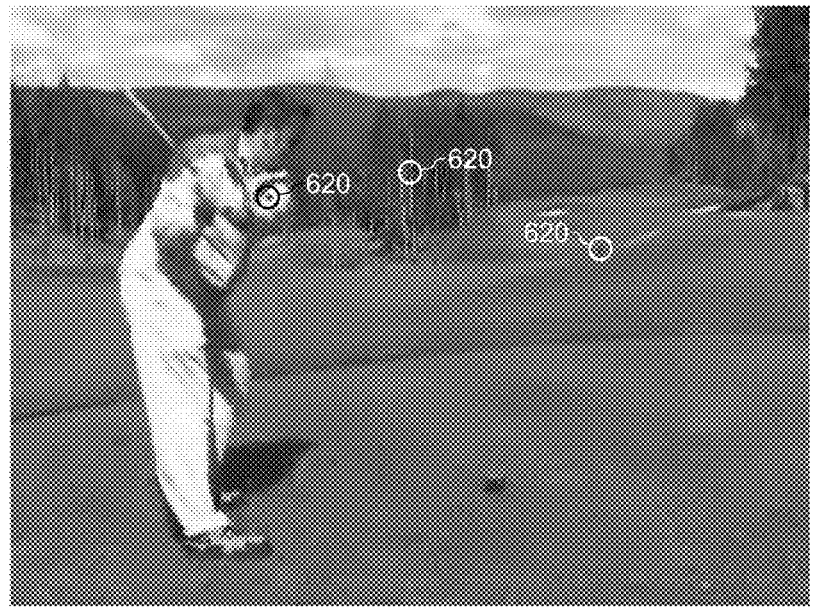

In embodiments, the pixels of the input image/video may be uniformly sampled based on their saliency gradient values to obtain (515) a set of anchor points. Thus, pixels with higher saliency gradient values are more likely to be selected than pixels with lower saliency gradient values. Specifically, in embodiments, the probability for a pixel i to be sampled as an anchor point is:

$$p_i = \frac{s_i}{\sum_{j=1}^{N} s_j},$$ Eq. 8 where $s_i$ is the saliency gradient value of the pixel i and N is the number of pixels in the image/video. Depending on the computational ability of the processor and the required fineness of the resized image/video, different numbers of anchor points can be sampled. FIG. 6 illustrates examples of anchor points (e.g, 615) in an image (605 of FIG. 6A) and anchor points (e.g, 620) in a frame of a video (FIG. 6B) according to various embodiments of the invention. For purposes of illustration, the anchor points are marked with "+" sign and some are labeled (e.g., 615 and 620) to help identify them. FIG. 6A uses 1% of the image pixels for anchor points. The image (610) of FIG. 6B uses 0.01% of the video pixels as anchor points.

It shall be noted that anchor point sampling is a highly flexible process. In embodiments, no particular method for sampling anchor points is critical to the present invention. One aspect of the present invention is the use of a subset of pixels (anchor pixels), to achieve the determination of the pixel mapping. Determining the mappings of a small number of anchor pixels from the original image/video by solving a linear system much smaller than that used in prior methods provides greater efficiency and faster processing. As is discussed in more detail below, the remaining pixels in the target image/video can be filled-in using the mappings of the anchor points, for example, by inpainting the other pixels by back-projection, based on the mappings of the nearby anchor points.

4. Anchor Pixel Mapping

The anchor point is a 2D point (x, y) in the original image, or a 3D point (x, y, t) in the original video. Consider, by way of example video resizing. Assume the original video has dimensions of w×h×l and the target video resolution is w'×h'×l'. In embodiments, resizing of each dimension (i.e., width, height, or time) is performed independently with a similar procedure. Thus, there is no difference between spatial and temporal video resizing other than operating on different dimensions. For purposes of illustration, presented below are methods to compute the mapping of x coordinates for all anchor points. It shall be noted that the same method is also used to calculate the mapping of y and t coordinates.

Figure 7:
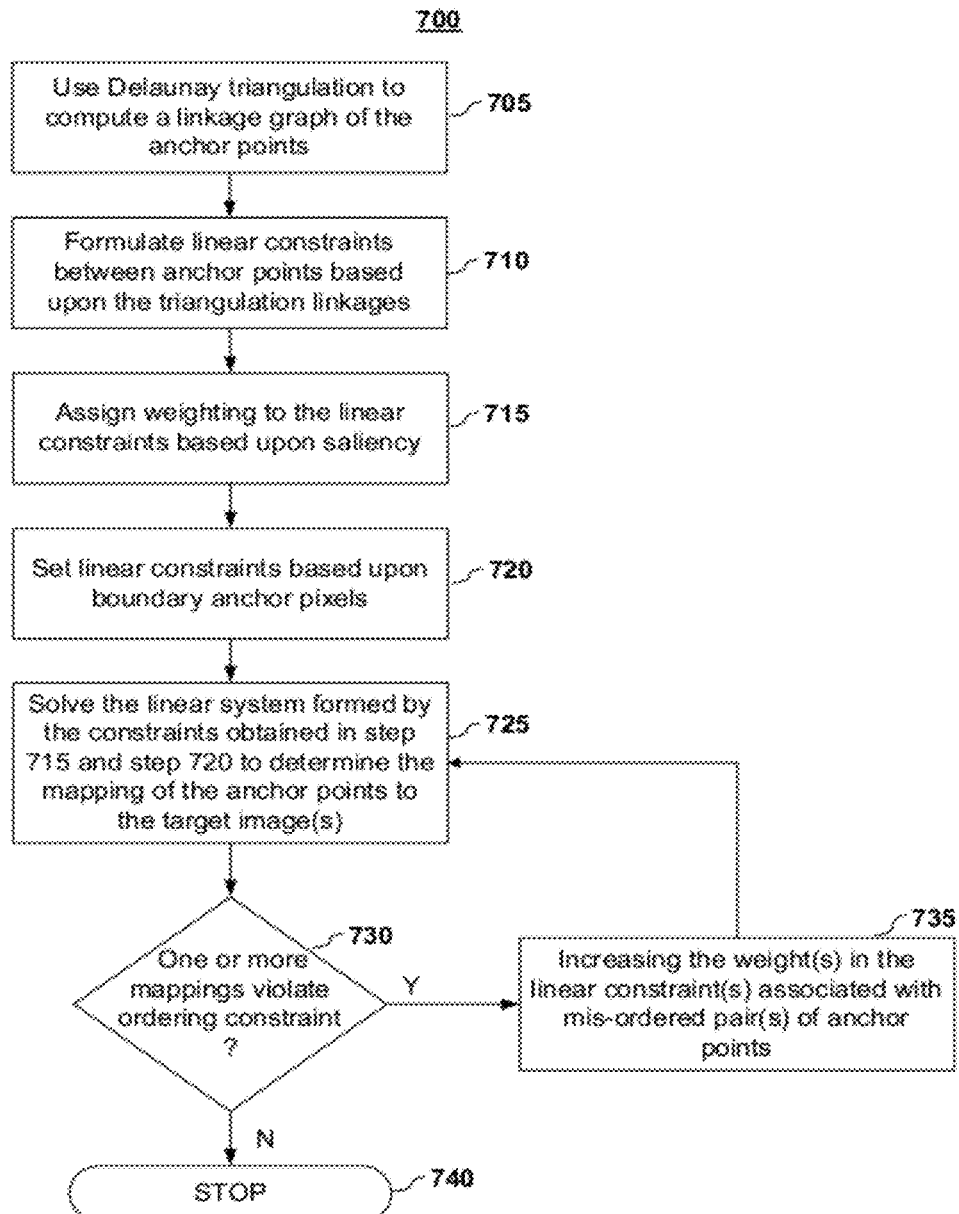
FIG. 7 depicts a method for obtaining a set of mappings according to various embodiments of the invention.

Mapping of the anchor points is calculated by solving a linear system of equations in the least-square manner. However, unlike prior methods that mapped all pixels, in embodiment of the present invention, the anchor points are no longer neighboring pixels. Thus, a different formulation is needed to properly represent the relationship between the anchor points. FIG. 7 depicts a method for obtaining a set of mappings (790) according to various embodiments of the invention.

Given a set of anchor pixels in the 2D or 3D space, Delaunay triangulation is used (705) to compute the most balanced linkage graph among the anchor pixels. Delaunay triangulation makes an optimal link between every two points, so that the minimum angle of all the angles of the triangles is maximized and skinny triangles are avoided. It should be noted that the Delaunay triangulation implicitly finds "good" neighbors for each anchor point, which tends to be the nearest in average across all the points.

Figure 8:
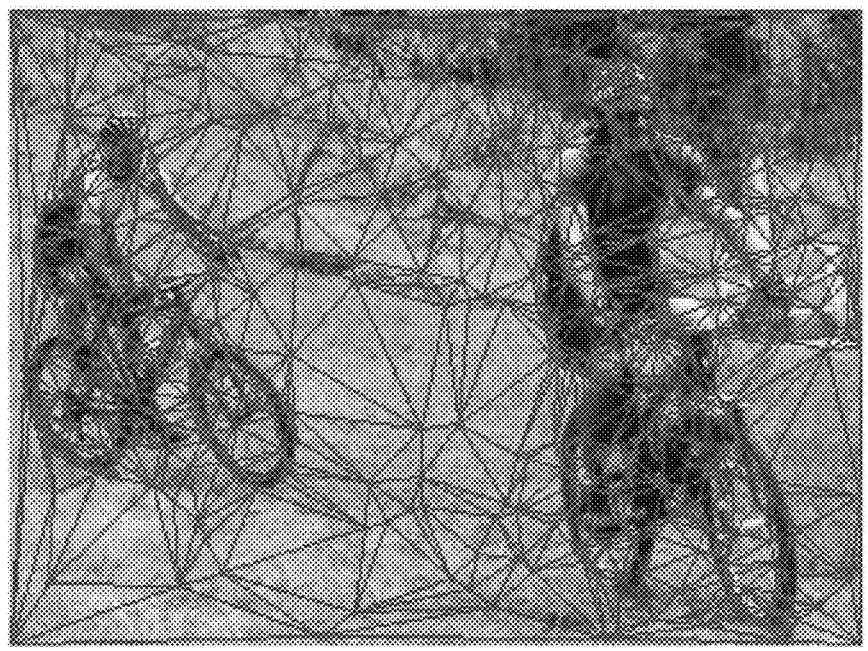
FIG. 8 illustrates examples of Delaunay triangulation in an image (FIG. 8A) and in a video (FIG. 8B) according to various embodiments of the invention.
Figure 8:
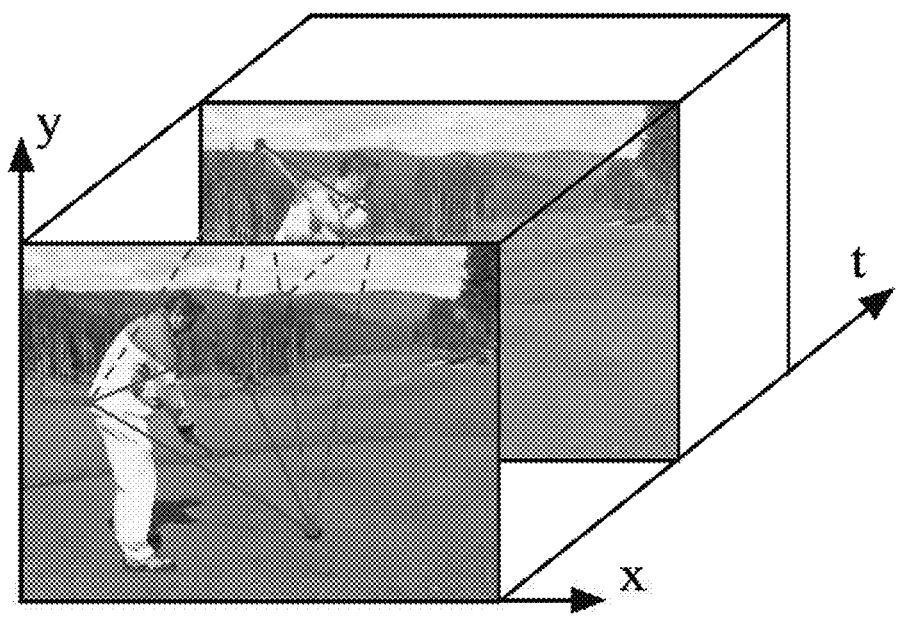

FIG. 8 illustrates examples of Delaunay triangulation in an image (FIG. 8A) and in a video (FIG. 8B) according to various embodiments of the invention. FIG. 8A shows the 2D triangulation of the anchor points sampled in an image. FIG. 8B conceptually depicts the 3D triangulation (tetrahedralization) of the anchor points sampled in a video cube.

The Delaunay triangulation forms a linkage map that establishes relationships between the anchor points. These relationships between anchor points based on the triangulation linkages can be formulated (710) into linear constraints. Based on the triangulation result, the relationship between two neighboring, or directly linked, anchor points can be expressed in equations, according to every edge of every triangle. Consider the following example. Assume that $x_1$ and $x_2$ are the x coordinates of two anchor points linked by one triangle edge, and they are mapped to $x_1'$ and $x_2'$ in the resized target. To preserve the content, the distance between $x_1'$ and $x_2'$ should be the same as that of $x_1$ and $x_2$, i.e., $$\frac{1}{x_1 - x_2}(x_1' - x_2') = 1$$ Eq. 9

In general this constraint will not be satisfied for all linked anchor points since the resizing by definition will change the distance between some of them. Thus, the constraints for linked pairs are weighted in such a way that those associated with more important anchor points are more influential on the mapping solution. In embodiments, a weight $S_{12}$ is set (715) for a linked pair of anchor points as the average saliency of all the pixels in the bounding region (2D or 3D) formed by their coordinates. Therefore, Equation 9, above, becomes:

$$\frac{S_{12}}{x_1 - x_2}(x_1' - x_2') = S_{12}$$ Eq. 10

The resulting mapping will then better preserve the distance of anchor points located at important regions than those located at unimportant regions. In contrast to prior methods, such constraints on either spatial or temporal dimensions are treated similarly for video resizing.

In addition to the set of linear constraints formed from the linkage graph, in embodiments, other constraints can be added to the set of linear constraints. To fit the target image/video in the desired dimensions, the anchor points that lie on the boundaries, both spatial and temporal, of the source image/video should be mapped (720) to the corresponding boundaries of the target image/video as well. In embodiments, a much higher weight ($S_0=100$) is given to the constraints on boundary anchor points:

$$s_0 \cdot x_3' = 0$$ Eq. 11

$$s_0 \cdot x_4' = s_0 \cdot w'$$ Eq. 12 where $x_3'$ is the mapped x coordinate of any anchor point that lies on the x=0 boundary, and $x_4'$ is the mapped x coordinate of any anchor point that lies on the x=w boundary. w is the original width and w' is the target width.

All of the constraints formed from Equations (10), (11), and (12) form a sparse linear system with the mapped positions as unknowns. Similar to the method disclosed by L. Wolf, M. Guttmann, and D. Cohen-Or in "Non-homogeneous content-driven video-retargeting," in Proc. IEEE Int'l Conf.

on Computer Vision, pages 1-6, 2007, which is incorporated by reference herein in its entirety, one can compute the least-square solution of the linear system to determine the mapping of the anchor points to the target image/video (725).

Ideally, the least-square solution of this system gives an optimal mapping of all the anchor points in the resized image/video, which respects the saliency score. However, there is no hard constraint that all anchor points are mapped in the range of the target image/video. That is, pixel ordering constraints are missing in this linear system. For example, all anchor points in the example given above should be constrained to be mapped to the range of [0, w']. Otherwise they can be mapped outside the boundaries.

Figure 9:
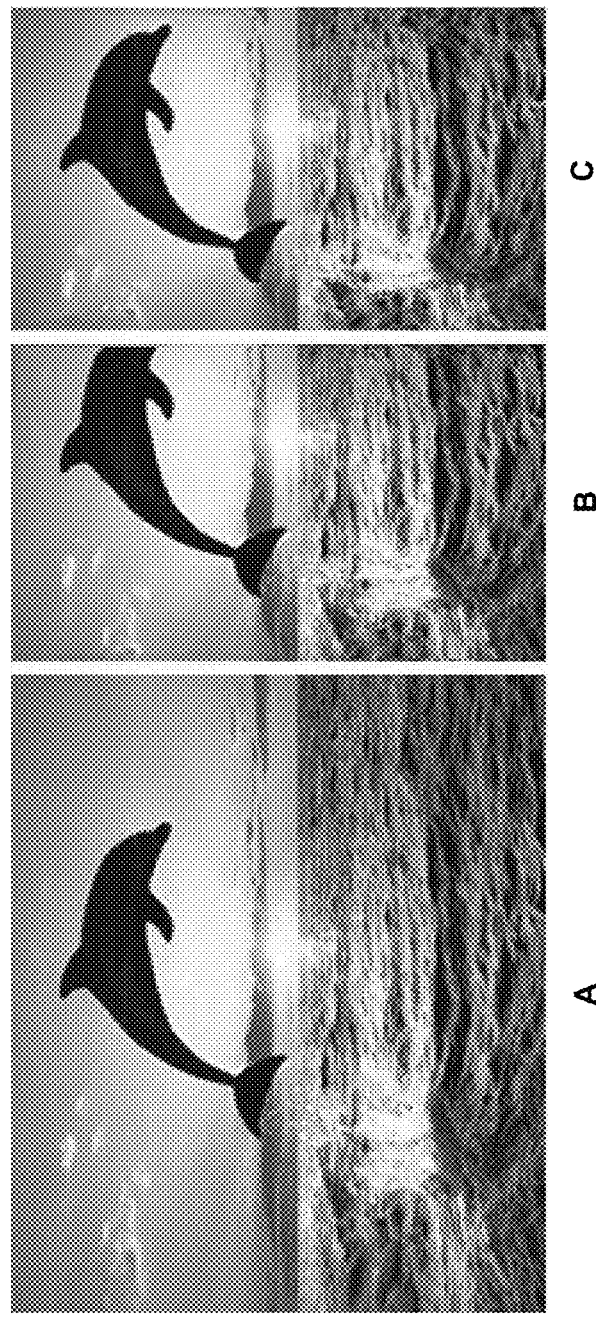
FIG. 9 illustrates resizing of an image when the mappings do not include ordering constraints (FIG. 9B) and when the mappings do include ordering constraints (FIG. 9C) according to various embodiments of the invention.

FIG. 9 illustrates resizing of an image when the mapping does not include ordering constraints (FIG. 9B) and when the mapping does include ordering constraints (FIG. 9C) according to various embodiments of the invention. When the image is shrunk too much relative to the size of the important object, the dolphin in this example, the direct least-square solution of the linear system formed using just Equations (10), (11), and (12) maps the pixels on the dolphin's head outside the image boundaries, as shown in FIG. 9B. In contrast, by including an ordering constraint as part of an iterative adaptation algorithm maintains the pixel ordering and achieves the desired target, as shown in FIG. 9C.

When the solution of the linear system violates the ordering constraints, the two sides of the corresponding equations in the system will have opposite signs, i.e., the mapping alters the original pixel ordering. To address this issue, the weight of a constraint is increased if the corresponding equation has opposite signs on its two sides (i.e., the left side and right side of the corresponding equation, e.g. Eq. (10) or Eq. (12)). For example, in embodiments, the prior weight, s, of the constraint that produced the mis-ordered anchor point mapping can be multiplied by another weight:

$$s = \alpha \cdot s, \alpha > 1 \quad \text{Eq. 13}$$

The least-square solution to the reweighted linear system is then recalculated. In embodiments, $\alpha$ is set to 1.1, although other values may be selected.

Thus, if one or more of the mappings violates (730) the ordering constraint, the weights of the constraints associated with those mis-ordered mappings are increased (735). This adaptive adjustment is iterated until all equations have identical signs (740) on both sides. This way the final mapping ensures the pixel ordering of the anchor points, both spatially and temporally.

Figure 10:
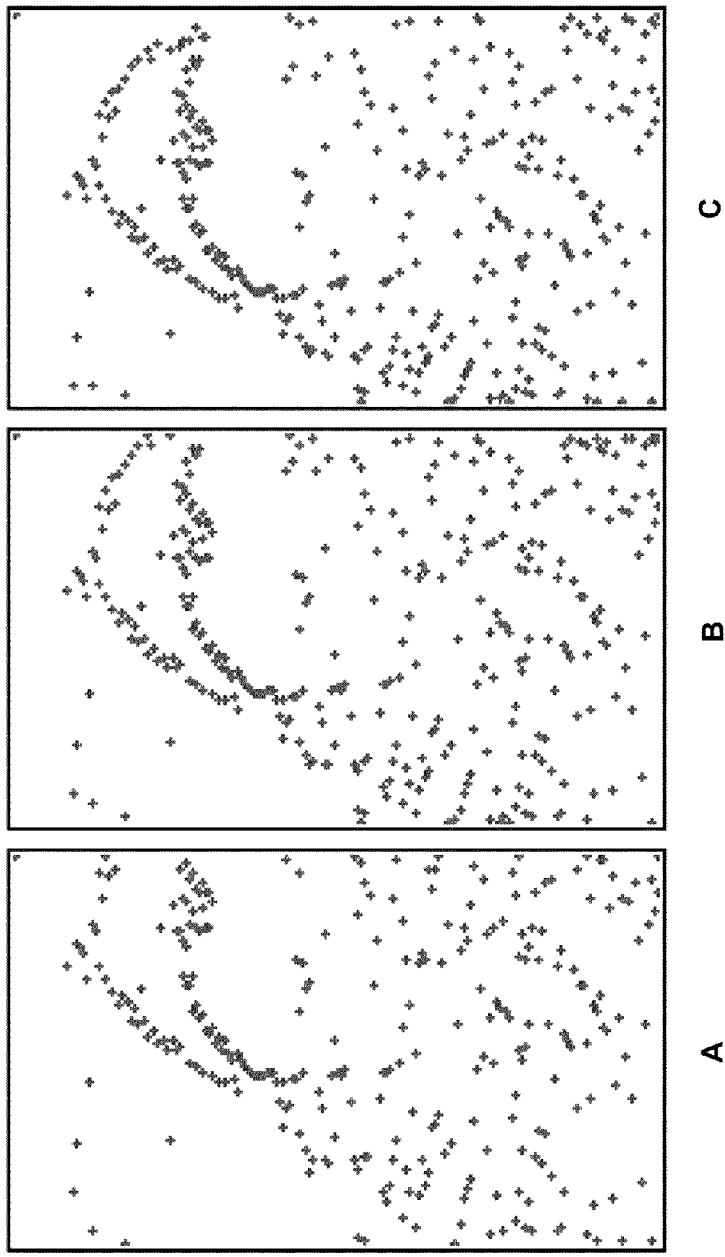
FIG. 10 illustrates anchor points for the images of FIG. 9 according to various embodiments of the invention.

FIG. 10 shows the mapped anchor point positions for the dolphin image of FIG. 9 at different iterations. FIG. 10A shows the mapped anchor point positions for the dolphin image at the first iteration. FIG. 10B shows the mapped anchor point positions for the dolphin image after approximately twenty iterations. And, FIG. 10C shows the mapped anchor point positions for the dolphin image after approximately forty iterations. As is clearly demonstrated in FIG. 10, the pixels mapped outside the boundaries by the direct least-square solution can be adjusted back to the proper positions by the iterative adaptation algorithm disclosed herein.

5. Mapping Other Pixels

Figure 11:
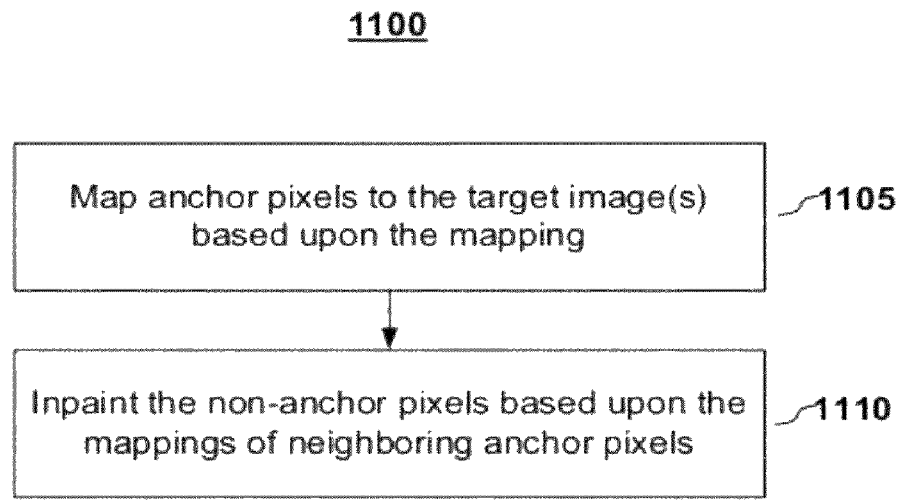
FIG. 11 depicts a method for warping a set of images to a set of target images according to various embodiments of the invention.

FIG. 11 depicts a method 1100 for warping a set of images to a set of target images according to various embodiments of the invention. After the set of anchor points are mapped (1105) to the resized image/video, other inner pixels of the original image/video can be warped into the area between anchor points. In embodiments, non-anchor pixels in the target can be inpainted (1110) based on the mappings of its neighboring anchor points. As each inner pixel lies in one of the 2D triangle or 3D tetrahedron found by Delaunay triangulation, its mapped position in the resized image/video can be calculated according to the related vertices (anchor points).

Figure 12:
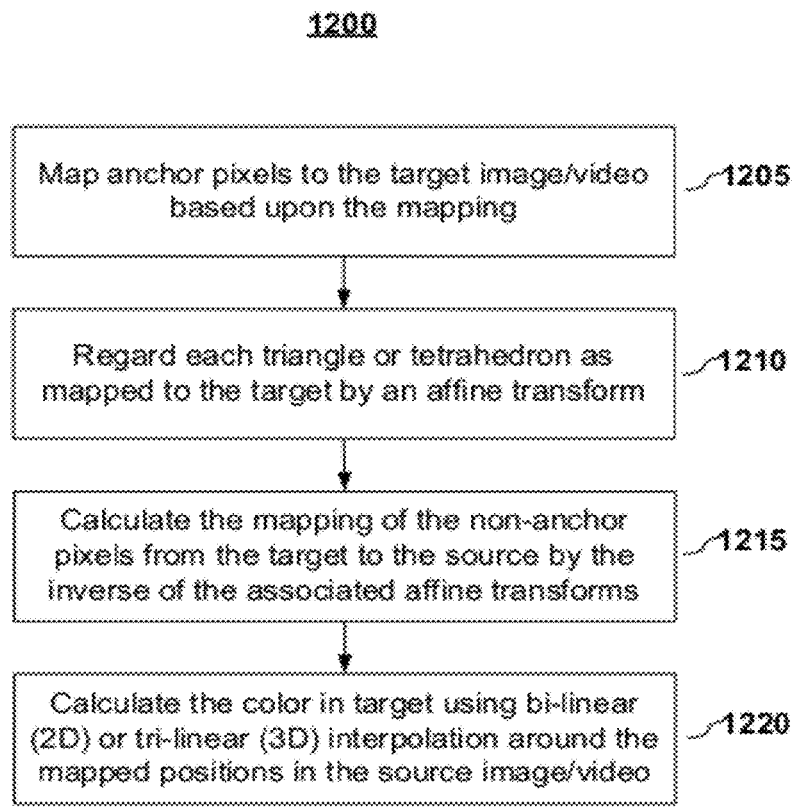
FIG. 12 depicts a method for warping a set of images to a set of target images according to various embodiments of the invention.

One skilled in the art shall recognize that there are several ways to inpaint the non-anchor pixels. FIG. 12 depicts a method for warping a set of images to a set of target images (1200) according to various embodiments of the invention. As the source image/video is divided into 2D triangles or 3D tetrahedrons by Delaunay triangulation and the mapping of all the vertices (anchor points) are acquired (1205), each triangle or tetrahedron can be regarded as mapped (1210) to the target by an affine transform. For any inner pixel (x, y, 1), located in the triangle with vertices $(x_1, y_1, 1)$, $(x_2, y_2, 1)$, $(x_3, y_3, 1)$, in the original image yields:

$$\begin{bmatrix} x \\ y \\ 1 \end{bmatrix} = \begin{bmatrix} x_1 & x_2 & x_3 \\ y_1 & y_2 & y_3 \\ 1 & 1 & 1 \end{bmatrix} \cdot \begin{bmatrix} c_1 \\ c_2 \\ c_3 \end{bmatrix}, \quad \text{Eq. 14}$$

where $c_1, c_2, c_3$ are weighted parameters of the 3 vertices. If the 3 vertices (anchor points) are mapped to $(x_1', y_1', 1)$, $(x_2', y_2', 1)$, $(x_3', y_3', 1)$ in the resized image respectively, the mapped position of this inner pixel is:

$$\begin{bmatrix} x' \\ y' \\ 1 \end{bmatrix} = \begin{bmatrix} x_1' & x_2' & x_3' \\ y_1' & y_2' & y_3' \\ 1 & 1 & 1 \end{bmatrix} \cdot \begin{bmatrix} c_1 \\ c_2 \\ c_3 \end{bmatrix} = \begin{bmatrix} x_1' & x_2' & x_3' \\ y_1' & y_2' & y_3' \\ 1 & 1 & 1 \end{bmatrix} \cdot \begin{bmatrix} x_1 & x_2 & x_3 \\ y_1 & y_2 & y_3 \\ 1 & 1 & 1 \end{bmatrix}^{-1} \cdot \begin{bmatrix} x \\ y \\ 1 \end{bmatrix}. \quad \text{Eq. 15}$$

Similarly, for any inner pixel (x, y, t, 1) in the original video cube, its mapped position (x', y', t', 1) can be computed based on the 4 vertices $(x_1, y_1, t_1, 1)$, $(x_2, y_2, t_2, 1)$, $(x_3, y_3, t_3, 1)$ and $(x_4, y_4, t_4, 1)$ of a tetrahedron.

Since the mapping of every pixel in the original image/video has been solved (1210), the resized result can be acquired by back projection and linear interpolation for non-integer coordinates. In embodiments, back projection is performed by calculating (1215) the mapping of the non-anchor pixels from the target to the source by the inverse of the associated affine transforms. The colors of the non-anchor pixels in the target are computed by bi-linear (2D) or tri-linear (3D) interpolation around the mapped positions in the source image/video (1220).

Figure 13:
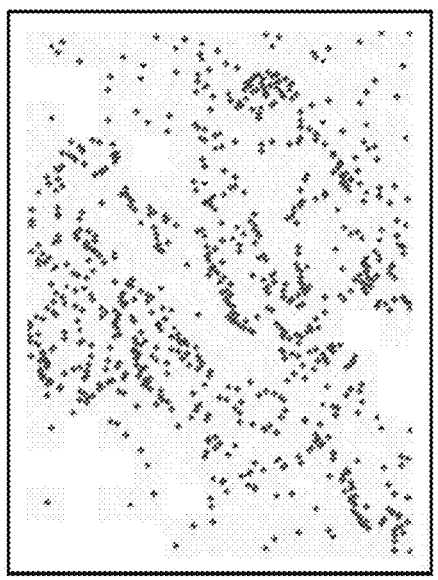
FIG. 13 illustrates a resized an image (FIG. 13B) and resizing of a video (FIG. 13D) according to various embodiments of the invention.
Figure 13:
Figure 13:
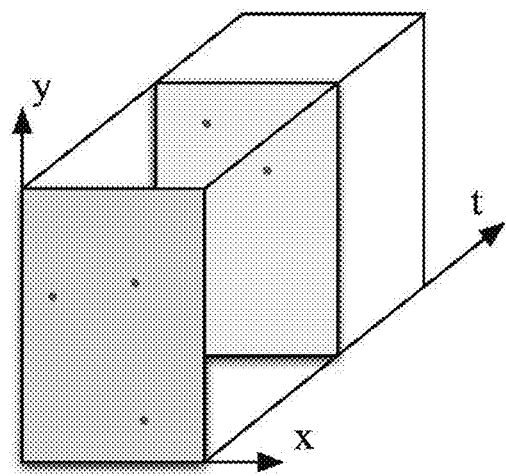
Figure 13:

FIG. 13A shows such a final mapping of the anchor points for a 2D image, and FIG. 13C conceptually shows a final 3D mapping for a video according to various embodiments of the invention. FIG. 13B shows the final result of the image after warping the input image to the target image according to the teachings of the present patent document. FIG. 13D shows an image frame from the video image after spatial video shrinking according to the teachings of the present patent document. Note that the shape of the important objects, e.g., the cyclist and the golfer, are well preserved.

It should be noted that resizing according to the teachings of the present invention have been tested on various images, with different backgrounds, either homogeneous or textural, and various objects, either with or without human face portraits. The extensive experiments confirmed that the resizing methods work well in both image enlarging and shrinking.

Testing has also been performed on video resizing, both spatially and temporally. These experiments confirm that the teachings of the present patent document work well in spatial video resizing, temporal video resizing, or any combination of these two due to its global nature.

Figure 14:
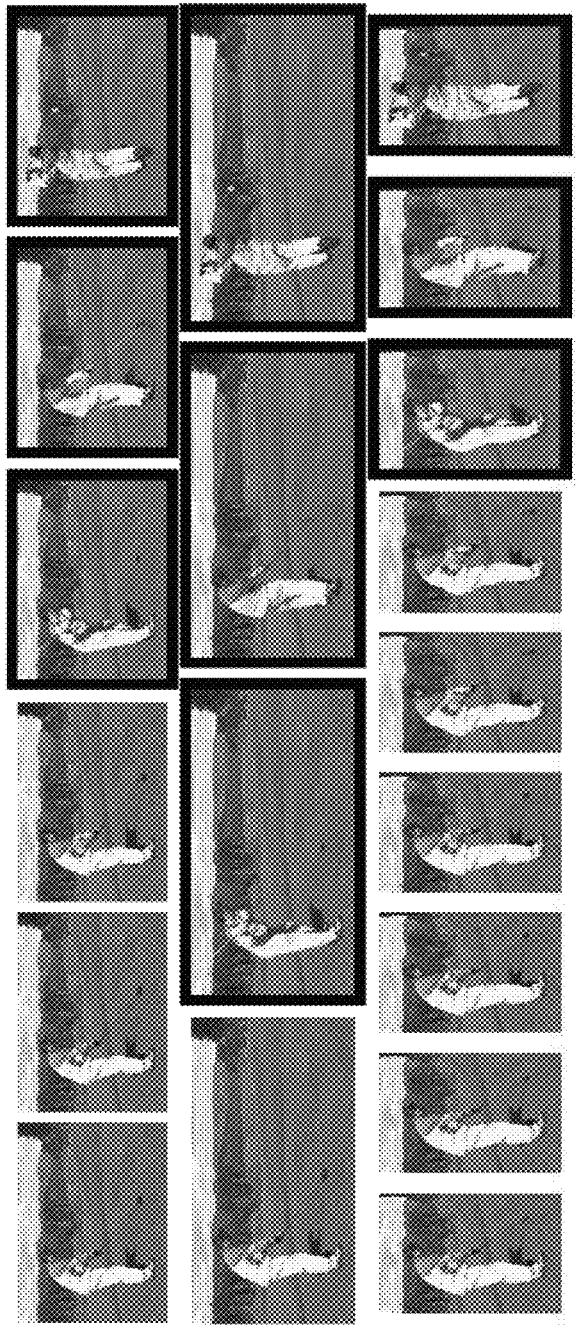
FIG. 14 illustrates examples of resized video according to various embodiments of the invention.

FIG. 14 illustrate examples of resized video according to various embodiments of the invention. In FIG. 14, the top line shows 6 frames selected from a golf video sequence (source) and each frame represents the same time segment. The first 3 segments are static scenes, which are unimportant. The last 3 segments (frames with thick borders) involve the swinging action, which is an important event. In the middle line, the video frames are enlarged and the temporal length is shortened to 4 time segments (only 4 representative frames). In the bottom line, the video frames are spatially shrunk and its temporal length is expanded to 9 time segments (9 representative frames). Note that the human figure is preserved when the frame is enlarged or shrunk, meanwhile the temporal event (swinging action) preserves its length (3 frames with thick borders) when the video is temporally shortened or expanded.

Figure 15:
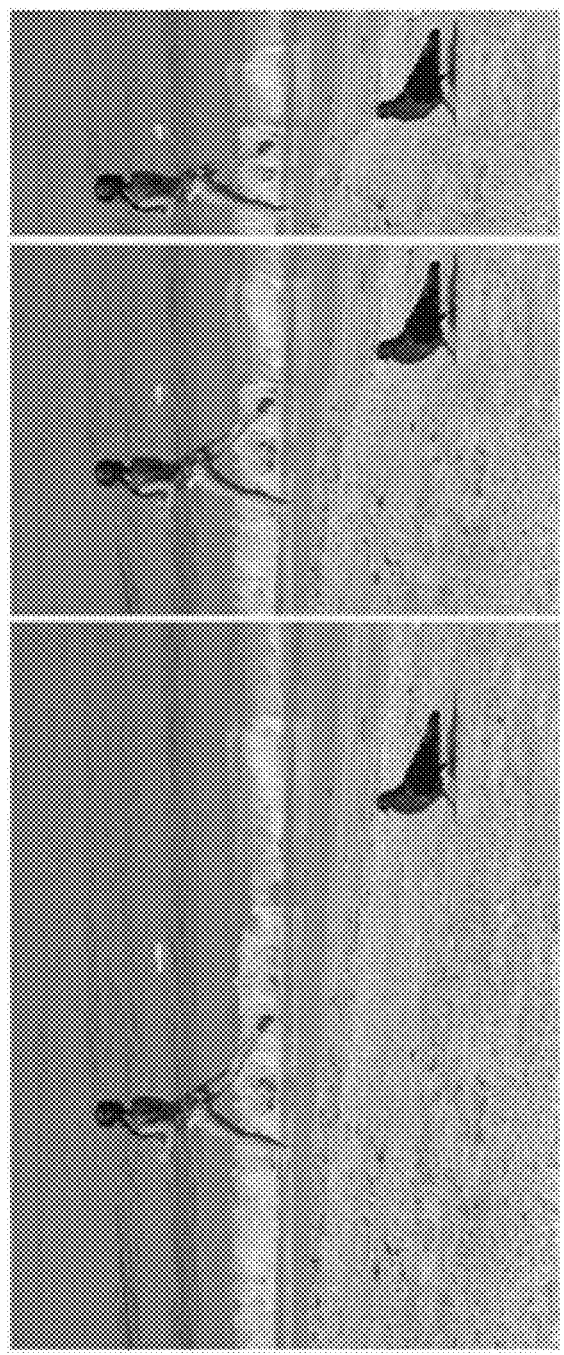
FIG. 15 illustrates examples of resized images according to various embodiments of the invention.

One skilled in the art shall recognize that additional alternatives can be added, such as object segmentation, event segmentation, or both. For example, in embodiment, when resizing a set of images that forms a video, scene changes may be detected (either manually or automatically) and the resizing may be performed on the video segments. In embodiments, important regions may be identified manually or automatically, and the ordering constraints may be limited to those important regions. Consider, by way of illustration and not limitation, the following example. As can be seen in FIG. 15, when the original image (FIG. 15A) is shrunk to half of its width (FIG. 15B), the resized image well preserves the major content—the little girl and the pigeon. But when it is shrunk to one quarter of the original width, even if the image seems to have enough space in the unimportant background pixels, the leg of the little girl gets somewhat compressed. This compression is due to the constraints to preserve pixel ordering. To maintain the original pixel ordering, the iterative method always ensures the leg of the girl stays to the left of the pigeon and never allows it to stretch to the right of the pigeon. By detecting and separating the important objects to preserve (e.g., the girl and the pigeon in FIG. 15A) and by only maintaining internal pixel ordering within each object while allowing more flexible ordering between the other pixels, the important content can further be preserved.

C. System Implementations

Figure 16:
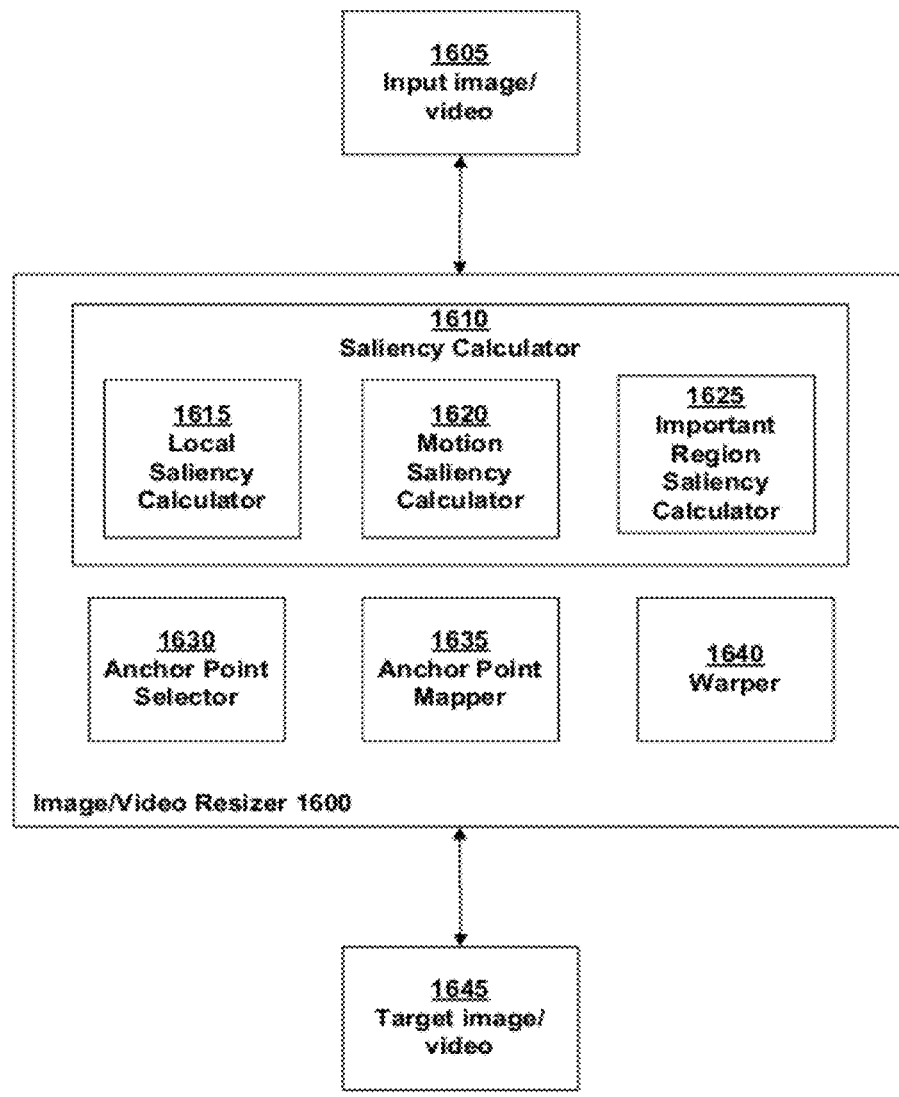
FIG. 16 depicts a block diagram of an image/video resizing system according to various embodiments of the invention.

FIG. 16 depicts an image/video resizing system according to various embodiments of the invention. Shown in FIG. 16 is an image/video resizer 1600 that receives as an input a set of images 1605, which may be a single image or a video, and outputs a set of target images 1645. In embodiments, image/video resizes comprises a saliency calculator 1610, an anchor point selector 1630, an anchor point mapper 1635, and a warper 1640.

Saliency calculator 1610 receives the input set of images and obtains saliency values for the pixels. In embodiments, saliency calculator 1610 obtains saliency values from one or more image features. In the depicted embodiment, saliency calculator 1610 comprises local saliency calculator 1615, motion saliency calculator 1620, and important region saliency calculator 1625. Saliency calculator 1610 may obtain saliency information as describe previous with reference to the method of FIG. 2.

In embodiments, anchor point selector 1630 receives the saliency values and uses that information to select anchor points. In embodiments, anchor point selector 1630 uses the saliency values of the pixels to calculate saliency gradient values. Alternatively, saliency calculator 1610 may calculate the saliency gradient values and provide those to the anchor point selector 1630. In embodiments, a saliency gradient map comprising the saliency gradient values is obtained according to the following formula:

$$\sqrt{\left(\frac{\partial S}{\partial x}\right)^2 + \left(\frac{\partial S}{\partial y}\right)^2}.$$ Eq. 6

Similarly for videos, the anchor points are pixels in the 3D video cube (x, y, t) with high three-dimensional (3D) gradient of saliency. In embodiments, a 3D saliency map can be obtained using the following formula:

$$\sqrt{\left(\frac{\partial S}{\partial x}\right)^2 + \left(\frac{\partial S}{\partial y}\right)^2 + \left(\frac{\partial S}{\partial t}\right)^2}.$$ Eq. 7

Given the saliency gradient information for the pixels, anchor point selector 1630 assigns pixels in the input image/video a sampling value proportional to the pixel's saliency gradient value. In embodiments, the saliency gradient value is normalized by the sum of the saliency gradient values of the pixels. Thus, pixels with high gradient of saliency (two-dimensional or three-dimensional) have higher possibility of being selected than pixels with lower saliency values.

In embodiments, anchor pixel selector randomly samples the pixels of the input image/video based on their saliency gradient values to obtain a set of anchor points. Thus, pixels with higher saliency gradient values are more likely to be selected than pixels with lower saliency gradient values. It shall be noted that anchor point sampling is a highly flexible process. Anchor point selector 1630 may employ alternative means to achieve its purpose of obtaining a subset of pixels (anchor pixels).

Anchor point mapper 1635 receives the set of anchor points and obtains a set of mappings that map the anchor points in the input set of images 1605 to the set of target images 1645. In embodiments, anchor point mapper 1635 obtains a set of mappings as described above with respect to the method depicted in FIG. 7. That is, given a set of anchor pixels in the 2D or 3D space, Delaunay triangulation is used to compute the most balanced linkage graph among the anchor pixels. The Delaunay triangulation forms a linkage map that establishes relationships between the anchor points. These relationships between anchor points based on the triangulation linkages are formulated into linear constraints. The constraints for linked pairs are weighted using the saliency information of the anchor points. In embodiments, a weight is set for a linked pair of anchor points as the average saliency of all the pixels in the bounding region (2D or 3D) formed by their coordinates.

In addition to the set of linear constraints formed from the linkage graph, in embodiments, the anchor point mapper 1635 adds other constraints to the set of linear constraints based upon boundary constraints. To fit the target image/video in the desired dimensions, the anchor points that lie on the boundaries, both spatial and temporal, of the source image/video are mapped to the boundaries of the target image/video as well. In embodiments, a high weight is given to such boundary constraints.

All of the constraints form a sparse linear system with the mapped positions as unknowns. Using a least-square solution of this system, anchor point mapper 1635 obtains a set of mappings of all the anchor points in the resized image/video, which respects the saliency score.

In embodiments, anchor point mapper 1635 also includes ordering constraints. When the solution of the linear system violates the ordering constraints, the offending constraints are re-weighted and the least-square solution to the reweighted linear system is recalculated. Anchor point mapper 1635 iterates this process until there are no mappings that result in mis-ordered anchor pixel pairs.

Warper 1640 receives the set of input images and the mappings and outputs the set of target images. In embodiments, warper 1640 obtains the set of target images as described above with respect to the methods depicted in FIG. 11 or FIG. 12.

In embodiments, warper 1640 maps the anchor points to the target image/video and inpaint the other, non-anchor pixels in the target image/video based on the mappings of its neighboring anchor points. Since the source image/video is divided into 2D triangles or 3D tetrahedrons by Delaunay triangulation and the mapping of all the vertices (anchor points) are acquired, each triangle or tetrahedron can be regarded as mapped to the target by an affine transform. Warper 1640 calculates the mapping of these non-anchor pixels from the target to the source by the inverse of the associated affine transforms, and their colors in the target are computed by bi-linear (2D) or tri-linear (3D) interpolation around the mapped positions in the source image/video.

D. Computing System Implementations

It shall be noted that the present invention may be implemented in any instruction-execution/computing device or system capable of processing image data, including without limitation, a general-purpose computer and a specific computer, such as one intended for data or image processing. The present invention may also be implemented into other computing devices and systems, including without limitation, a digital camera, a printer, a scanner, a multiple function printer/scanner, a facsimile machine, a multimedia device, and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 17:
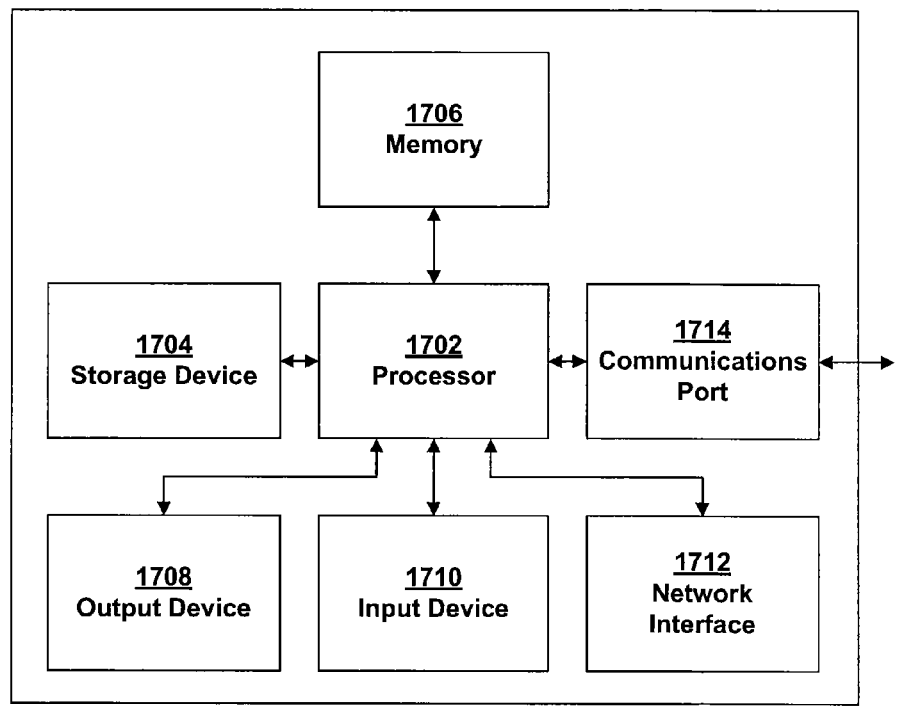
FIG. 17 depicts a block diagram of a computing system according to various embodiments of the invention.

FIG. 17 depicts a functional block diagram of an embodiment of an instruction-execution/computing device 1700 that may implement or embody embodiments of the present invention. As illustrated in FIG. 17, a processor 1702 executes software instructions and interacts with other system components. In an embodiment, processor 1702 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1704, coupled to processor 1702, provides long-term storage of data and software programs. Storage device 1704 may be a hard disk drive and/or another device capable of storing data, such as a computer-readable media (e.g., diskettes, tapes, compact disk, DVD, and the like) drive or a solid-state memory device. Storage device 1704 may hold programs, instructions, and/or data for use with processor 1702. In an embodiment, programs or instructions stored on or loaded from storage device 1704 may be loaded into memory 1706 and executed by processor 1702. In an embodiment, storage device 1704 holds programs or instructions for implementing an operating system on processor 1702. In one embodiment, possible operating systems include, but are not limited to, UNIX, AIX, LINUX, Microsoft Windows, and the Apple MAC OS. In embodiments, the operating system executes on, and controls the operation of, the computing system 1700.

An addressable memory 1706, coupled to processor 1702, may be used to store data and software instructions to be executed by processor 1702. Memory 1706 may be, for example, firmware, read only memory (ROM), flash memory, non-volatile random access memory (NVRAM), random access memory (RAM), or any combination thereof. In one embodiment, memory 1706 stores a number of software objects, otherwise known as services, utilities, components, or modules. One skilled in the art will also recognize that storage 1704 and memory 1706 may be the same items and function in both capacities. In an embodiment, one or more of the components of FIG. 16 may be modules stored in memory 1704, 1706 and executed by processor 1702.

In an embodiment, computing system 1700 provides the ability to communicate with other devices, other networks, or both. Computing system 1700 may include one or more network interfaces or adapters 1712, 1714 to communicatively couple computing system 1700 to other networks and devices. For example, computing system 1700 may include a network interface 1712, a communications port 1714, or both, each of which are communicatively coupled to processor 1702, and which may be used to couple computing system 1700 to other computer systems, networks, and devices.

In an embodiment, computing system 1700 may include one or more output devices 1708, coupled to processor 1702, to facilitate displaying graphics and text. Output devices 1708 may include, but are not limited to, a display, LCD screen, CRT monitor, printer, touch screen, or other device for displaying information. Computing system 1700 may also include a graphics adapter (not shown) to assist in displaying information or images on output device 1708.

One or more input devices 1710, coupled to processor 1702, may be used to facilitate user input. Input device 1710 may include, but are not limited to, a pointing device, such as a mouse, trackball, or touchpad, and may also include a keyboard or keypad to input data or instructions into computing system 1700.

In an embodiment, computing system 1700 may receive input, whether through communications port 1714, network interface 1712, stored data in memory 1704/1706, or through an input device 1710, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A non-transitory computer-readable medium carrying one or more sequences of instructions, wherein execution of the one or more sequences of instructions by one or more processors causes the one or more processors to resize a set of images comprising pixels by performing the steps comprising:
    calculating a saliency value for at least some of the pixels in the set of images;
    using the saliency values to select a set of anchor pixels, the set of anchor pixels being a subset of the pixels in the set of images;
    defining a set of linear constraints comprising linear constraints based upon pixel pairs selected from the set of anchor pixels;
    using the set of linear constraints to compute a set of mappings of the set of anchor pixels in the set of images to a set of target pixels in a set of target images, the set of target images having at least one dimension that is different from the set of images; and
    warping the set of images to the set of target images based at least in part upon the set of mappings.

2. The non-transitory computer-readable medium of claim 1 wherein the set of images comprises a single image or comprises a plurality of images that form a video.

3. The non-transitory computer-readable medium of claim 1 wherein the step of calculating a saliency value for at least some of the pixels in the set of images comprises the steps of:
    for each pixel of the at least some of the pixels in the set of images, determining an overall saliency value based upon at least one of a local saliency value, a motion saliency value, and a content saliency value for the pixel.

4. The non-transitory computer-readable medium of claim 3 wherein the step of determining an overall saliency value based upon a content saliency value comprises the steps of:
    identifying a region of important content within the set of images; and
    assigning a high saliency value to the pixels in the identified region.

5. The non-transitory computer-readable medium of claim 4 wherein the step of identifying a region of important content within the set of images comprises the steps of:
    using a face detector to identify faces within the set of images.

6. The non-transitory computer-readable medium of claim 1 wherein the step of using the saliency values to select a set of anchor pixels, the set of anchor pixels being a subset of the pixels in a set of images, comprises the steps of:
    determining saliency gradient values based upon the saliency values;
    assigning each pixel from a set of pixels selected from the set of images a sampling value proportional to its saliency gradient value; and
    obtaining the set of anchor pixels by sampling pixels from the set of pixels based upon the assigned sampling value.

7. The non-transitory computer-readable medium of claim 1 wherein the step of defining a set of linear constraints comprising linear constraints based upon pixel pairs selected from the set of anchor pixels comprises the steps of:
    computing a linkage graph of the set of anchor pixels;
    formulating a set of linear constraints between anchor pixels based upon the linkage graph, wherein a linear constraint is formed from a pair of anchor pixels weighted by a saliency value associated the pair of anchor points; and
    for each anchor pixel that lies on a boundary in the set of images:
        formulating a linear constraint that maps the anchor pixel to a corresponding boundary on the set of target images; and
        adding the linear constraint to the set of linear constraints.

8. The non-transitory computer-readable medium of claim 7 wherein the step of using the set of linear constraints to compute a set of mappings of the set of anchor pixels in the set of images to a set of target pixels in a set of target images, the set of target images having at least one dimension that is different from the set of images comprises the steps of:
    computing a solution to the set of linear constraints to obtain the set of mappings of the set of anchor pixels in the set of images to a set of target pixels in the set of target images; and
    responsive to a mapping from the set of mappings resulting in a pair of anchor pixels of a linear constraint having a different ordering in the set of target images than in the set of the images:
    altering the set of linear constraints so that the linear constraint associated with the pair of anchor pixels that have a different ordering in the set of target images has an increased weighting; and
    returning to the step of computing a solution to the set of linear constraints to obtain the set of mappings of the set of anchor pixels in the set of images to a set of target pixels in the set of target images.

9. The non-transitory computer-readable medium of claim 7 wherein the step of warping the set of images to the set of target images based at least in part upon the set of mappings comprises the steps of:
    using the set of mappings to map the set of anchor pixels to the set of target images; and
    for triangles or tetrahedrons from the linkage graph:
        regarding a triangle or tetrahedron from the linkage graph as being mapped to the set of target images by an affine transform;
        using an inverse of the affine transform to map non-anchor pixels from the set of target images to the set of images; and
        using interpolation of corresponding pixels in the set of images to assign color values to non-anchor pixels in the set of target images.

10. A computer-implemented method for resizing a set of input images by performing the steps comprising:
 [a] selecting a set of pixels from the set of input images;
 [b] defining a set of linear constraints based upon pixel pairs from the set of pixels;
 [c] using the set of linear constraints to compute a set of mappings of the set of pixels in the set of input images to a set of target images, wherein the set of target images has at least one dimension that is different from the set of images;
 [d] responsive to the mapping resulting in pixels in a pixel pair having a different ordering in the set of target images than in the image, altering the set of linear constraints by assigning an increased weight to a linear constraint in the set of linear constraints associated with the pixel pair and returning to step [c]; and
 [e] using the set of mappings to warp the set of input images to the set of target images.

11. The computer-implemented method of claim 10 wherein the set of pixels is a set of anchor pixels and the step of selecting a set of pixels from the set of input images comprises:
 selecting the set of anchor pixels based upon pixel saliency, the set of anchor pixels being a subset of the pixels in the set of images.

12. The computer-implemented method of claim 11 wherein the step of selecting a set of pixels from the set of input images comprises:
 calculating a saliency value for at least some of the pixels in a set of input images; and
 using the saliency values to select the set of anchor pixels.

13. The computer-implemented method of claim 12 wherein the step of calculating a saliency value for at least some of the pixels in a set of input images comprises:
 for each pixel of the at least some of the pixels in the set of images, determining an overall saliency value based upon one or more of a local saliency value, a motion saliency value, and a content saliency value for the pixel.

14. The computer-implemented method of claim 11 wherein the step of defining a set of linear constraints based upon pixel pairs from the set of pixels comprises:
 computing a linkage graph of the set of anchor pixels;
 formulating a set of linear constraints between anchor pixels based upon the linkage graph, wherein a linear constraint is formed from a pair of anchor pixels weighted by a saliency value associated the pair of anchor points; and
 for each anchor pixel that lies on a boundary in the set of images,
  formulating a linear constraint that maps the anchor pixel to a corresponding boundary on the set of target images; and
  adding the linear constraint to the set of linear constraints.

15. The computer-implemented method of claim 14 wherein the step of using the set of mappings to warp the set of input images to the set of target images comprises:
 using the set of mappings to map the set of anchor pixels to the set of target images;
 for triangles or tetrahedrons from the linkage graph:
  regarding a triangle or tetrahedron from the linkage graph as being mapped to the set of target images by an affine transform;
  using an inverse of the affine transform to map non-anchor pixels from the set of target images to the set of images; and
  using interpolation of corresponding pixels in the set of images to assign color values to non-anchor pixels in the set of target images.

16. A system for resizing a set of images comprising pixels, the system comprising:
 a saliency calculator, coupled to receive the set of images, that calculates a saliency value for at least some of the pixels in a set of images;
 an anchor point selector, coupled to receive the saliency values, that uses the saliency values to selects a set of anchor pixels, which is a subset of the pixels in the set of images;
 an anchor point mapper, coupled to receive the set of anchor pixels, that defines a set of linear constraints comprising linear constraints based upon pixel pairs selected from the set of anchor pixels and that uses the set of linear constraints to compute a set of mappings of the set of anchor pixels in the set of images to a set of target pixels in a set of target images, the set of target images having at least one dimension that is different from the set of images; and
 a warper, coupled to receive the set of mappings and the set of input images, that warps the set of images to the set of target images based at least in part upon the set of mappings.

17. The system of claim 16 wherein the set of images comprises a single image or comprises a plurality of images that form a video.

18. The system of claim 16 wherein the saliency calculator calculates a saliency value for at least some of the pixels in a set of images by performing the steps comprising:
 for each pixel of the at least some of the pixels in the set of images, determining an overall saliency value based upon one or more of a local saliency value, a motion saliency value, and a content saliency value for the pixel.

19. The system of claim 16 wherein the anchor point selector select a set of anchor pixels using the saliency values by performing the steps comprising:
 determining saliency gradient values based upon the saliency values;
 assigning each pixel from a set of pixels selected from the set of images a sampling value proportional to its saliency gradient value; and
 obtaining the set of anchor pixels by sampling pixels from the set of pixels based upon the assigned value.

20. The system of claim 16 wherein the anchor point mapper defines a set of linear constraints comprising linear constraints based upon pixel pairs selected from the set of anchor pixels and uses the set of linear constraints to compute a set of mappings of the set of anchor pixels in the set of images to a set of target pixels in a set of target images by performing the steps comprising:
 computing a linkage graph of the set of anchor pixels;
 formulating a set of linear constraints between anchor pixels based upon the linkage graph, wherein a linear constraint is formed from a pair of anchor pixels weighted by a saliency value associated the pair of anchor points;
 for each anchor pixel that lies on a boundary in the set of images,
  formulating a linear constraint that maps the anchor pixel to a corresponding boundary on the set of target images; and
  adding the linear constraint to the set of linear constraints;

computing a solution to the set of linear constraints to obtain the set of mappings of the set of anchor pixels in the set of images to a set of target pixels in the set of target images; and responsive to a mapping from the set of mappings resulting in a pair of anchor pixels of a linear constraint having a different ordering in the set of target images than in the set of the images:

altering the set of linear constraints so that the linear constraint associated with the pair of anchor pixels that have a different ordering in the set of target images has an increased weighting; and returning to step of computing a solution to the set of linear constraints to obtain the set of mappings of the set of anchor pixels in the set of images to a set of target pixels in the set of target images.

21. The system of claim 20 wherein the warper warps the set of images to the set of target images based at least in part upon the set of mappings by performing the steps comprising:

using the set of mappings to map the set of anchor pixels to the set of target images;

for triangles or tetrahedrons from the linkage graph:

regarding a triangle or tetrahedron from the linkage graph as being mapped to the set of target images by an affine transform;

using an inverse of the affine transform to map non-anchor pixels from the set of target images to the set of images; and using interpolation of corresponding pixels in the set of images to assign color values to non-anchor pixels in the set of target images.

* * * * *